THIN FILM SUPERCONDUCTING SOLENOIDS

Filed March 20, 1963 2 Sheets-Sheet 1

INVENTOR.
DONALD E. ANDERSON
BY
Moore, White & Bird
ATTORNEYS

THIN FILM SUPERCONDUCTING SOLENOIDS

Filed March 20, 1963 2 Sheets-Sheet 2

INVENTOR.
DONALD E. ANDERSON
BY Moore, White & Burd
ATTORNEYS

United States Patent Office 3,205,413

Patented Sept. 7, 1965

3,205,413

THIN FILM SUPERCONDUCTING SOLENOIDS

Donald E. Anderson, St. Paul, Minn., assignor to The Regents of The University of Minnesota, Minneapolis, Minn., a corporation of Minnesota Filed Mar. 20, 1963, Ser. No. 266,584
16 Claims. (Cl. 317—158)

This invention relates to solenoid devices and methods of making the same. More particularly, this invention relates to multi-layer thin film superconducting alloy solenoids whose windings are separated by thin deposited dielectric films, and to the methods of making such solenoid devices.

Large air-core solenoids (or solenoids with other cores of non-ferromagnetic properties) are used to produce intense magnetic fields. The intense magnetic field may be used directly or, in other cases, the solenoid is intended solely for use as an inductor, or energy storage device. The stored energy in the magnetic field is given by ½ $LI^2$ joules, where L is in henries and I is in amperes, or alternatively by a volume integral of the magnetic energy density, $$\frac{1}{2\eta_0}B^2 \text{ joules/meter}^3$$

where B is in webers/meter$^2$ and $\eta_0=4\pi\times10^{-7}$.

It is possible to store peak energy densities of very high value in a magnetic field. For example, a magnetic field of 100,000 gauss or 10 webers/meter$^2$ has an energy density of $4\times10^7$ joules/meter$^3$.

The use of magnetic stored energy devices is usually limited as a consequence of two factors. The most serious drawback is the effective Q of an inductor which, for air-core windings, is a measure of the $I^2R$ joule heating of the windings. This power loss normally rules out the use of inductors for slow charging rates, since the power dissipation in joules/second or watts soon equals the energy input, and also poses severe problems of heat dissipation.

The second major problem associated with normal wire-wound inductors for peak energy storage is that of intense mechanical forces on the conductors. This can be viewed either as a consequence of a force of BI newtons per meter acting directly on the conductor, or of a Maxwell Stress of $$\frac{1}{2\eta_0}B^2$$

newtons/meter$^2$ basically associated with the field itself. In either viewpoint, forces of the order of 6000 p.s.i. act on a solenoid "containing" a magnetic field of 100,000 gauss. Such forces, and abrupt changes in force induced during discharge, place very stringent demands on insulation, spacers, and retainers.

Superconducting wire-wound solenoids have been constructed which remove the first difficulty associated with magnetic energy storage ($I^2R$ or joule heating) completely, since the conductors have zero resistance, even when carrying large currents in an intense magnetic field. "Hard" superconducting wires, consisting of strained alloys such as $Nb_3Sn$, $Nb_xZr_{1-x}$, and $V_3Ga$ can carry current densities of the order of 500,000 amperes/cm.$^2$ in fields as high as 500,000 gauss before "switching" to the normal state. This corresponds to a peak stored energy density of $10^9$ joules/meter$^3$ and, further, no energy dissipation occurs if the solenoid remains superconducting.

The very real problems of fabricating a very long continuous alloy wire without flaws, forming a solenoid, and successfully operating the solenoid in the presence of large mechanical stresses at liquid helium temperatures remain to be answered. The present invention is directed to superconducting solenoid devices, and techniques for fabricating the devices by thin film techniques, to significantly increase maximum field limits and mechanical strength.

The first specific advantage is that of forming a "hard" superconductor, that is, an alloy which remains superconducting in the presence of an intense magnetic field. The present state of the art involves fabricating wires by techniques such as filling a niobium tube with niobium and zirconium powder, drawing, then sintering. Alternatively, vapor-phase reactions on the surface of the wire have been used. In any case, the resulting wire tends to be brittle and difficult to fabricate in extreme lengths without flaws. A single flaw in a resulting winding can destroy the usefulness of the solenoid since, at some low value of current, that portion of the winding will revert to the "normal" state. Resultant $I^2R$ heating will then propagate a thermal wave into the remainder of the solenoid, destroying the device if total stored energies are sufficiently high.

According to the present invention thin-film "sheets" of "hard" superconducting alloy are formed in place as layers of a solenoid.

The superconducting alloy layers are deposited by thin film deposition techniques which are known in the art and which per se form no part of the present invention. These alloy layers are deposited by atomic beam sources such as thermal evaporators in vacuum or targets sputtered by ion bombardment in a gas plasma.

Multiple sources of the constituents of the alloy are used to deposit thin alloy films on a rotating substrate. The properties of the alloy (thickness, strain, homogeneity, and composition) are controlled by varying the source rates and the rate of rotation of the substrate. It should be noted that the superconducting layers near the axis of the solenoid are required to carry current in the presence of a higher magnetic field than is present near the periphery of the solenoid. The properties of the film may be smoothly varied as subsequent layers of the solenoid are deposited to compensate for this.

Separation of individual layers of the winding is provided by placing an insulator source so that a thin insulating film is also deposited continuously on the rotating substrate.

Exemplary insulating layer material includes aluminum oxide, silicon oxide, magnesium oxide, tantalum pentoxide, titanium dioxide, and the like. These materials are also deposited by evaporation or sputtering, as known in the art. Alternatively, the insulating layers can be produced by continuously oxidizing the surface of the deposited alloy layer, for example by directing oxygen ions onto the surface of an evaporated alloy film.

Such a multi-layer thin film solenoid possesses much greater mechanical strength than achievable with wound wires separated by insulators.

The principal object of the present invention is to provide superconducting solenoid devices and techniques for fabricating such devices by thin film deposition.

A further object of the present invention is the provision of solenoid devices whose windings are formed of thin films of hard superconducting alloy deposited in place.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which.

Broadly stated, the structures of the present invention comprise laminar windings made up of alternately deposited thin superconducting metallic alloy film layers and thin dielectric film layers of extreme thinness. Each layer of metallic alloy film and dielectric film has a thickness of the order of about 100 A. to 10,000 A. The invention also encompasses specific forms of superconducting solenoids and methods for forming them as described hereinafter.

Figure 1:
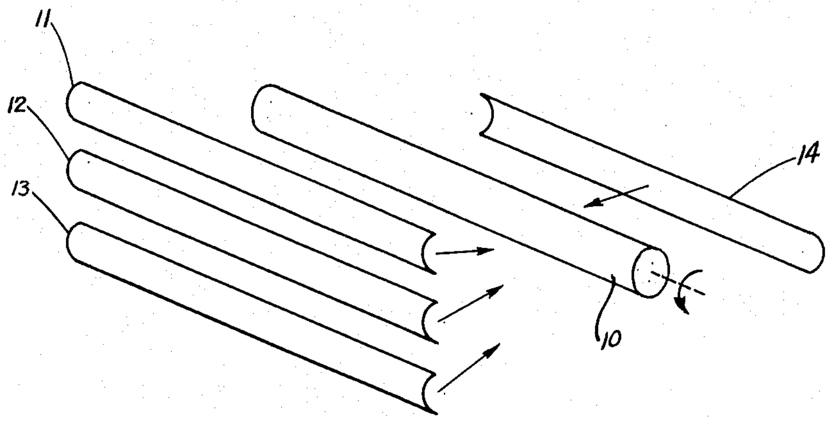
FIGURE 1 is a schematic illustration of means by which a multi-layer solenoid may be fabricated by simultaneous exposure to sources of superconducting alloy components and a source of insulating material.

Referring now to the drawings, in FIGURE 1 there is shown schematically one means by which a superconducting solenoid according to the present invention is produced. An appropriate cylindrical and rotatable substrate 10 is positioned within the range of metallic alloy deposition sources 11, 12, and 13 and an insulator deposition source 14. The substrate 10 may be solid or tubular and may be formed from an insulating material or from a bulk hard superconducting alloy.

The individual metallic sources 11, 12 and 13 are sources of the alloy constituents such as tantalum, tin, titanium, vanadium, gallium, indium, niobium, zirconium, silicon, and the like. These individual sources may be thermal evaporators. Alternatively, the metallic constituents may be deposited as a result of sputtering of appropriate targets with gas ions. For example, tantalum may be deposited by bombarding a tantalum surface with $A^+$ ions.

The insulator source 14 may be a thermal evaporator for direct deposition of an insulating material such as silicon oxide (SiO). Alternatively, the insulating layers may be deposited by sputtering of appropriate targets with gas ions. For example, magnesium oxide or aluminum oxide surfaces may be bombarded with $A^+$ ions. The insulating layers can also be produced by continually oxidizing the surface of the alloy, for example by directing oxygen ions onto the surface of an evaporated alloy film.

Figure 2:
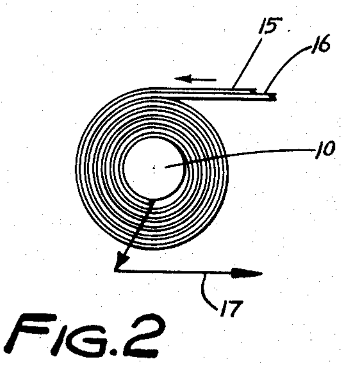
FIGURE 2 is a schematic end elevation of a multi-layer solenoid produced by the means of FIGURE 1.
Figures 2A, 3A:
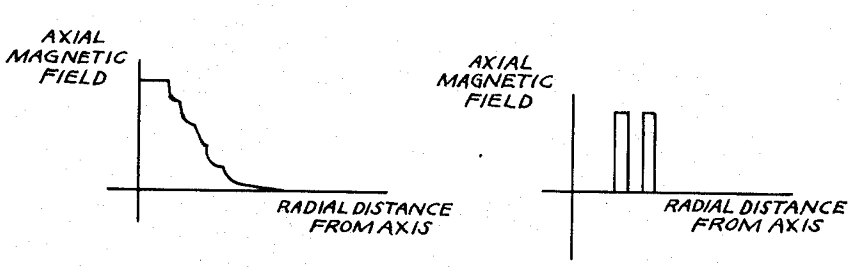
FIGURE 2A shows graphically the magnetic field intensity of a solenoid having the geometry of FIGURE 2.
FIGURE 3A shows graphically the magnetic field intensity of a solenoid of the geometry of FIGURE 3.

In FIGURE 2 there is shown a schematic end elevation of a multi-layer superconducting alloy solenoid produced by the means of FIGURE 1. The solenoid structure of FIGURE 2 includes the cylindrical substrate 10 having alternate spirally wound film layers of superconducting alloy 15 and insulation 16. In this instance, because of the extreme thinness of the films and the necessarily exaggerated scale at which they must be illustrated, only a few representative layers for illustrative purposes may be shown. In actual practice, the solenoid may have of the order of $10^3$ to $10^6$ turns. In a typical example, the solenoid winding has 100,000 turns with each layer being of the order of $10^{-5}$ cm. in thickness. The path of the current is as indicated by the direction of the arrows. A conductor 17 is connected to the substrate, if the substrate is conductive or to the conducting alloy layer in contact with the substrate, if the substrate is nonconductive, to permit current flow. The magnetic field intensity of a solenoid having the geometry shown in FIGURE 2 is shown graphically in FIGURE 2A.

The composition or the thickness of individual layers, or both, can be progressively varied to produce a solenoid device having optimum properties. For example, an alloy film having an initial composition of 50% niobium and 50% zirconium may be varied gradually as the film layers are wound about the rotating substrate by progressively decreasing the amount of zirconium deposited while at the same time increasing the amount of niobium deposited until the composition of the outer deposited layers equals 75% niobium and 25% zirconium. The thickness of the deposited layers can be controlled by varying the rate of rotation of the substrate. In a typical situation the alloy layer thickness is 5,000 A. adjacent the core and 500 A. adjacent the outer periphery. The inner thickness may vary between about 5,000 A. to 10,000 A. and the outer film thickness between about 100 A. and 1,000 A.

Figure 3:
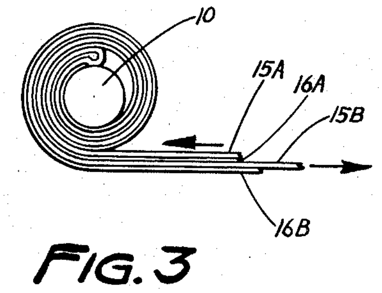
FIGURE 3 is a schematic end elevation of a double wound multi-layer solenoid.

In FIGURE 3 there is shown a schematic end elevation of a double wound multi-layer thin film superconducting solenoid. According to this embodiment, the substrate 10 is preferably a nonconducting material. A first layer 16A of insulating material is deposited. A first layer 15A of superconducting alloy material is deposited on the first layer of insulation. A second insulating layer 16B is deposited on the first alloy layer and a second alloy layer 15B is deposited on the second insulating layer.

Figure 4:
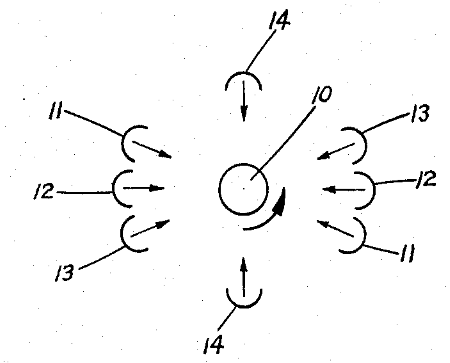
FIGURE 4 is a schematic illustration showing a configuration of sources of alloy components and insulating materials for the production of double wound solenoids of the geometry of FIGURE 3.

In FIGURE 4 there is shown schematically a configuration of sources of alloy components and insulating materials for the production of such a double wound solenoid. The substrate 10 rotates between alternating alloy component sources 11, 12 and 13 and insulation sources 14. A separate set of individual alloy sources is required for each layer of superconducting alloy and a separate insulating source is necessary for each layer of insulation. The ends of alloy layers 15A and 15B are connected so as to be in electrically conductive relationship at their ends nearest the core of the solenoid.

The path of current is as indicated by the arrows. The current flows from the periphery of the solenoid through one of the alloy layers toward the axis and flows back from the axis to the periphery through the other of the alloy layers, the alloy layers being separated from one another by the intervening alternating layers of insulation. The current flows in through one winding and returns out through the interleaved winding.

In a solenoid of this configuration, the magnetic field intensity does not increase as the axis of the solenoid is approached but is uniform between pairs carrying equal and opposite currents (and zero between alternate layers which form half-pairs as shown). The magnetic field intensity of a solenoid of the geometry of FIGURE 3 is shown graphically in FIGURE 3A.

Again, because of the necessity for greatly exaggerating layer thicknesses, the configuration of FIGURE 3 is representative only. The actual solenoid device is composed of thousands of alternating layers of extreme thinness.

Figure 5:
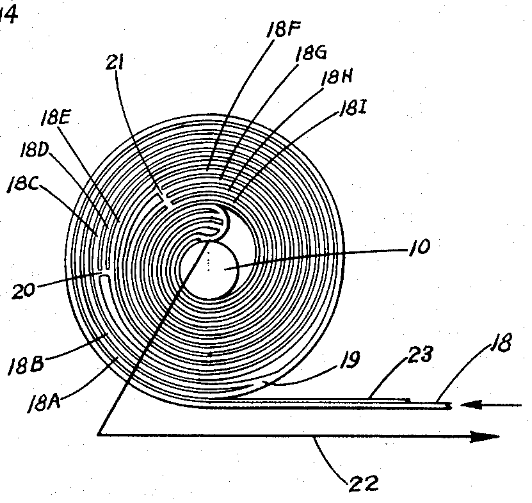
FIGURE 5 is a schematic end view of a solenoid device having interconnected multi-layers.

In FIGURE 5 there is shown in schematic end elevation a solenoid device having interconnected multi-layers. This embodiment permits the maximum available field for existing alloy properties. Successively more and more interconnected alloy films are arranged in parallel as the axis is approached to permit the inner layers to carry less current per layer where the magnetic field is most intense. As the axis of the solenoid is approached from the periphery, the single superconducting alloy film 18 is joined at juncture 19 to two parallel alloy films 18A and 18B. These in turn are joined at juncture 20 to three parallel alloy layers 18C, 18D and 18E which in turn are joined at juncture 21 to four parallel superconducting films 18F, 18G, and 18H and 18I.

A leadout conductor 22 is brought out from the substrate 10, if conductive, or from the last assembly of parallel layers, if the substrate is formed from a nonconductive material. The alternate alloy layers are separated by layers 23 of insulating material. The successive layers are deposited from a configuration of sources comparable to that of FIGURE 4 with the required number of sources to produce the required number of layers.

Figure 5A:
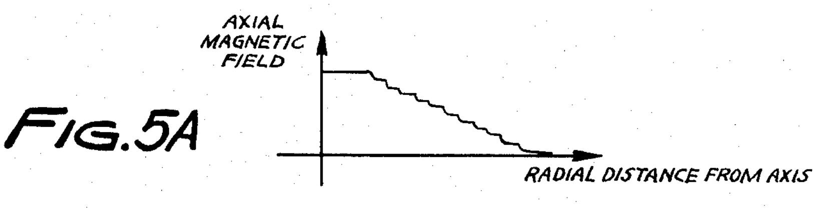
FIGURE 5A is a graphic representation of magnetic field intensity of a solenoid of the geometry of the solenoid of FIGURE 5; and, FIGURE 5B is a graphic representation of current density per layer of a solenoid of the same geometry.
Figure 5B:
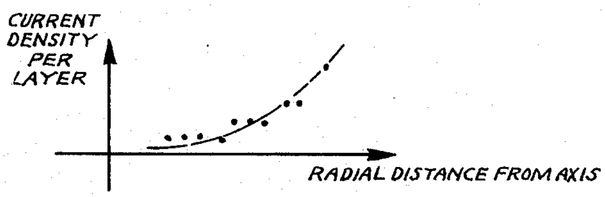

Since a solenoid of the configuration of FIGURE 5 is formed from the substrate outwardly, initially a larger number of layers is deposited and this number diminishes as the periphery is approached. The number of turns in parallel may range from 1 to thousands in integer steps and the total number of turns may be many thousands. FIGURES 5A and 5B, respectively, show graphically the magnetic field intensity of a solenoid of the geometry illustrated in FIGURE 5 and the current density per layer of a solenoid of the same geometry.

The solenoid configurations according to the present invention permit the realization of large solenoids with intense magnetic fields. The magnetic field can be generated gradually using a modest power source since, as the current is forced to increase against the self-inductance of the coil, all energy input is stored without loss in the final magnetic field. When such solenoids are used as accumulators of energy, in fashion similar to that of chemical storage batteries, the energy can be retained by finally short circuiting the input-output terminals, preferably with a superconducting link. Energy in the form of a near-constant current source feeding any desired load impedance can then be extracted either slowly or at an extremely high power level for a limited length of time governed by the total energy initially stored.

The technique of the present invention makes possible the production of a mechanically strong solenoid device by means of vapor deposition of the conductor and insulator layers. There is provided the means for controlling the strain or homogeneity within the superconductor layer. The superconducting alloy may purposely be made non-homogeneous in order to improve its properties. The composition and thickness of the layers may be uniformly graded from the axis to the periphery in order to optimize properties for the higher magnetic field in the center of the solenoid.

The alloy films have been deposited in laminar fashion in which extremely thin films of the alloy components are deposited separately and alternately and repeated several times to produce an alloy layer of desired thickness. For example, a 1,000 A. layer of niobium-zirconium alloy is deposited in the form of five 100 A. sub-layers of niobium alternating with five 100 A. sub-layers of zirconium. This produces an alloy which is deliberately non-homogeneous. This requires a separate source for each sub-layer. An intentionally non-homogeneous alloy may be deposited from a single set of alloy component sources operated alternately. The alloy has also been deposited in homogeneous fashion with atoms each of the alloy components arriving at the surface continuously and simultaneously in the desired ratio.

The invention is further illustrated, but not limited, by the following examples:

*Example 1*

A superconducting thin film solenoid is produced by depositing a niobium-zirconium alloy in spiral wound form on a rotating fire polished glass substrate. The alloy has the composition $Nb_xZr_{1-x}$ where $x$ indicates the mole fraction of niobium in the alloy. The alloy is deposited by thermal evaporation in a high vacuum. A sample of niobium in the form of a cylinder approximately one-half inch in diameter and one inch long is heated by bombarding the center of one face of the cylinder with a focused electron beam. Electron currents of the order of 50 ma. are drawn to the source held at +5,000 volts with respect to a heated tungsten filament. The niobium cylinder is enclosed within concentric spaced apart tubes of tantalum which serve as heat shields. A molten pool of niobium is formed contained in a "crucible" of the solid portion of the niobium cylinder. This molten pool is heated well above the melting point of niobium to yield the desired vapor pressure for deposition. A similar zirconium sample is heated in the same fashion. These two evaporators are mounted side by side so that they both face the rotating glass substrate suspended above them. The alloy component evaporators are operated simultaneously and continuously to deposit a continuous spiral thin film winding on the rotating substrate. To insulate successive turns of the alloy layer of the winding from each other, an insulating layer of silicon oxide (SiO) is deposited progressively on top of the deposited alloy film by direct evaporation of silicon oxide from a heated tungsten vessel. This dielectric source is shielded from the alloy component sources so as to deposit the silicon oxide film immediately on top of the deposited alloy layer while avoiding co-mingling of the evaporated materials. Both films are deposited to a thickness of about 1,000 A. The simultaneous thermal evaporation processes are continued until a structure of the desired number of turns, for example 100,000, has been produced.

*Example 2*

Superconducting alloy films have also been produced by sputtering in an argon atmosphere. According to this method, a niobium-zirconium alloy is formed by placing targets of niobium and zirconium in an argon discharge. The argon discharge itself is produced by admitting pure argon to a previously evacuated system to a pressure of the order of $10^{-3}$ mm. Hg. Tungsten filaments with tantalum shields within the evacuated system are heated to about 2,000° C. to provide a source of electrons. A potential of +30 volts is applied to tantalum anode rings or discs disposed between the heated filaments and the niobium and zirconium targets. Under these conditions electrons are emitted from the filaments and moved toward the anode rings. An axial magnetic field of about 1,000 gauss is produced by an external permanent magnet. This magnetic field traps electrons in the region of the anodes and insures intense ionization of the argon atoms. Positive argon ions are made to bombard the niobium and zirconium targets by holding those targets at potentials several hundred volts negative with respect to the discharge. The yield of niobium or zirconium sputtered for a given ion current is a known function of the potential through which the argon ions have been accelerated. Thus, the amount of niobium and zirconium deposited on the substrate can be quantitatively controlled. In this example the alloy is deposited on a fire polished glass substrate. The insulating layer is deposited in the same atmosphere in the same manner by bombardment of a target of dielectric material such as aluminum oxide.

*Example 3*

A solenoid device having a non-homogeneous laminar superconducting alloy is produced by thermal evaporation in much the same manner as described in Example 1. However, in order to produce a laminar non-homogeneous alloy film a separate alloy component source is provided for each individual sub-layer. Thus, to produce an alloy film of 1,000 A. composed of alternating niobium and zirconium sub-layers of 100 A. each, a total of five sources of each metallic atom are provided and these are shielded from each other to insure deposition in a laminar structure. The insulating layer is then deposited on top of the laminar alloy layer by thermal deposition of silicon oxide with the same precaution to shield the insulating material from the alloy component sources.

*Example 4*

As a further example, a coil is formed on a rotating fire polished tubular glass core by thermally evaporating niobium and zirconium to produce an alloy of composition $Nb_{0.5}Zr_{0.5}$ and thermally evaporating silicon monoxide to deposit a layer of insulation between turns of the alloy winding. The core typically has a length of 5 cm. and a diameter of 2 cm. The alloy and insulation are deposited as the core is rotated through 4,000 turns. The composition of the alloy is held constant but its thickness is varied uniformly from 4,200 A. at the center of the coil to 440 A. at its periphery. The deposited layers thus have a total thickness of about 0.87 mm. The turns of the coil wall carry 50 amps of current. The coil as a whole will produce a magnetic field of 50,000 gauss in the core.

Although illustrated with particular reference to niobium-zirconium alloy films, other superconducting alloys such as niobium-tin, niobium-titanium, vanadium-titanium, vanadium-silicon, vanadium-gallium, etc., are produced in the same mannner. Alloy films of the formula in $Nb_xZr_{1-x}$ have been formed both by thermal evaporation and sputtering with $x$ varying from 1.0 to 0.25. The current density which can flow in such films has been found to be over $10^6$ A./cm.$^2$ of film cross section. It is found that the optimum film composition depends upon the magnetic field in which the film is forced to carry current. High niobium alloys are capable of carrying more current at low fields. High zirconium alloys are capable of carrying more current at high fields. Thus, in depositing the many turns of the solenoid both the thickness and the composition of the individual turns are preferably continually varied to provide optimum economy in the total quantity of superconductor required for any given solenoid.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A multi-layer thin film superconducting solenoid comprised of a substrate, a continuous unbroken electrically conductive metallic winding extending in a multitude of turns around said substrate from the surface thereof to the periphery of the solenoid, said winding being composed of at least one thin continuous unbroken deposited film layer of superconducting alloy, and a thin unbroken deposited film layer of electrically insulating material interposed between each pair of successive alloy layers of said winding.

2. A solenoid according to claim 1 further characterized in that said winding includes a single continuous spiral wound deposited film layer of superconducting alloy extending from the surface of the substrate to the periphery of the solenoid.

3. A solenoid according to claim 1 further characterized in that said solenoid is double wound and said winding includes a pair of spaced apart interleaved continuous spiral wound deposited film layers of superconducting alloy, the ends of said pair of alloy film layers adjacent the axis of the solenoid being connected so as to be electrically conductive whereby one of said pair of film layers may function as a path for inflow of current as the other of said pair of film layers functions as a path for outflow of current, and a thin unbroken deposited film layer of electrically insulating material between said pair of film layers spacing the same apart.

4. A solenoid according to claim 1 further characterized in that said winding includes a plurality of interconnected continuous unbroken spiral wound deposited film layers of superconducting alloy, the film layers comprising each turn of the winding progressively decreasing in number from adjacent the axis of the solenoid to a single layer adjacent the periphery of the solenoid, the innermost ends of the film layers comprising the innermost turn of said solenoid being electrically connected to one another, each adjacent pair of film layers of the plural film layers comprising turns of the winding being spaced apart by a thin unbroken deposited film layer of electrically insulating material.

5. A solenoid according to claim 1 further characterized in that each of said deposited film layers is of the order of about 100 A. to 10,000 A. thickness.

6. A solenoid according to claim 1 further characterized in that said solenoid has from about $10^3$ to about $10^6$ turns of superconducting alloy film layers.

7. A solenoid according to claim 1 further characterized in that said superconducting alloy film layer varies uniformly in thickness from thicker adjacent the axis of said solenoid to thinner adjacent the periphery of the solenoid.

8. A solenoid according to claim 7 further characterized in that said superconducting alloy film layer varies uniformly in thickness from between about 5,000 to 10,000 A. adjacent the axis of the solenoid to between about 100 to 1,000 A. adjacent the periphery of the solenoid.

9. A solenoid according to claim 1 further characterized in that said superconducting alloy film layer is nonhomogeneous.

10. A solenoid according to claim 9 further characterized in that said non-homogeneous alloy film layer is laminar in configuration being composed of a plurality of alternating thinner film sub-layers of superconducting alloy components.

11. A solenoid according to claim 1 further characterized in that said superconducting alloy film layers are composed of an alloy of composition $M_xM^1_{1-x}$ where M is a metal selected from the group consisting of niobium and vanadium, and $M^1$ is a metal selected from the group consisting of tin, zirconium, gallium, titanium and silicon, and $x$ indicates the mole fraction of M in the alloy and is a number between 0.25 and 1.0.

12. A multi-layer thin film superconducting solenoid comprised of a substrate, a continuous unbroken electrically conductive metallic winding extending in from about $10^3$ to $10^6$ turns around said substrate from the surface thereof to the periphery of the solenoid, said winding being composed of at least one thin continuous unbroken deposited film layer of superconducting alloy, and a thin unbroken deposited film layer of electrically insulating material interposed between each pair of successive alloy layers of said winding, each of said deposited film layers being of the order of about 100 to 10,000 A. in thickness.

13. A solenoid according to claim 12 further characterized in that said winding includes a single continuous spiral wound deposited film layer of superconducting alloy extending from the surface of the substrate to the periphery of the solenoid.

14. A solenoid according to claim 12 further characterized in that said solenoid is double wound and said winding includes a pair of spaced apart interleaved continuous spiral wound deposited film layers of superconducting alloy, the ends of said pair of alloy film layers adjacent the axis of the solenoid being connected so as to be electrically conductive whereby one of said pair of film layers may function as a path for inflow of current as the other of said pair of film layers functions as a path for outflow of current, and a thin unbroken deposited film layer of electrically insulating material between said pair of film layers spacing the same apart.

15. A solenoid according to claim 12 further characterized in that said winding includes a plurality of interconnected continuous unbroken spiral wound deposited film layers of superconducting alloy, the film layers comprising each turn of the winding progressively decreasing in number from adjacent the axis of the solenoid to a single layer adjacent the periphery of the solenoid, the innermost ends of the film layers comprising the innermost turn of said solenoid being electrically connected to one another, each adjacent pair of film layers of the plural film layers comprising turns of the winding being spaced apart by a thin unbroken deposited film layer of electrically insulating material.

16. A method of making a multi-layer thin film superconducting solenoid which comprises depositing upon a rotating core a thin continuous unbroken electrically conductive metallic film layer composed of superconducting alloy components, simultaneously depositing a thin continuous unbroken film layer of electrically insulating material on top of the deposited alloy layer, and continuing simultaneous deposition of alloy and insulation until a winding of desired number of turns is produced.

References Cited by the Examiner

UNITED STATES PATENTS

| | | | |
|---|---|---|---|
| 3,090,023 | 5/63 | Brennemann et al. ---- | 340—173.1 |
| 3,113,889 | 12/63 | Cooper et al. --------- | 117—212 |

OTHER REFERENCES

Kolm et al.: "High Magnetic Field," The M.I.T. Press, John Wiley and Sons, Inc., New York, New York, 1962 (pages 592–596), QC–760–16–1961.

JOHN F. BURNS, *Primary Examiner.*